US010444367B2

(12) United States Patent
Lodden et al.

(10) Patent No.: US 10,444,367 B2
(45) Date of Patent: Oct. 15, 2019

(54) ENHANCED LIDAR AIR DATA USING SUPPLEMENTARY SENSOR OUTPUTS

(71) Applicant: Honeywell International Inc., Morris Plains, NJ (US)

(72) Inventors: Grant Lodden, Minnetrista, MN (US); Xiao Zhu Fan, Plymouth, MN (US); Danny Thomas Kimmel, Phoenix, AZ (US); Brett Gordon Northcutt, Paradise Valley, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 307 days.

(21) Appl. No.: 15/171,502

(22) Filed: Jun. 2, 2016

(65) Prior Publication Data
US 2017/0248700 A1   Aug. 31, 2017

Related U.S. Application Data

(60) Provisional application No. 62/300,190, filed on Feb. 26, 2016.

(51) Int. Cl.
*B64D 43/02* (2006.01)
*G01S 17/95* (2006.01)
(Continued)

(52) U.S. Cl.
CPC ............ *G01S 17/95* (2013.01); *B64D 43/02* (2013.01); *G01P 5/26* (2013.01); *G01P 21/025* (2013.01);
(Continued)

(58) Field of Classification Search
CPC ................................ G01S 17/95; B64D 43/02
See application file for complete search history.

(56) References Cited

U.S. PATENT DOCUMENTS

| 7,561,067 B2 | 7/2009 | Matayoshi et al. |
| 8,434,358 B2 | 5/2013 | Asahara et al. |
| (Continued) | | |

FOREIGN PATENT DOCUMENTS

EP      2434296       3/2012

OTHER PUBLICATIONS

NPL-Ben Lambert-Degrees of freedom part 1 and part 2: https://www.youtube.com/watch?v=-4aiKmPC994, published on Jun. 9, 2013 and accessed on Jun. 11, 2018.*

(Continued)

*Primary Examiner* — Jess Whittington
(74) *Attorney, Agent, or Firm* — Fogg & Powers LLC

(57) ABSTRACT

A method of enhancing LiDAR data is provided. The method includes inputting LiDAR data from at least one LiDAR sensor; inputting data from at least one of: at least one static pressure sensor; and at least one total air temperature sensor; and extracting accurate air data parameters by processing one of: the LiDAR data and static pressure data from the static pressure sensor; the LiDAR data and true temperature data from the total air temperature sensor; or the LiDAR data, the static pressure data from the static pressure sensor, and the true temperature data from the total air temperature sensor. The method also includes generating augmented air data based on the extracted accurate air data parameters and outputting the augmented air data.

8 Claims, 13 Drawing Sheets

(51) Int. Cl.
*G01P 5/26* (2006.01)
*G01P 21/02* (2006.01)
*G01S 17/02* (2006.01)
*G01S 17/58* (2006.01)

(52) U.S. Cl.
CPC ............ *G01S 17/023* (2013.01); *G01S 17/58* (2013.01); *Y02A 90/19* (2018.01)

(56) References Cited

U.S. PATENT DOCUMENTS

| | | | |
|---|---|---|---|
| 8,527,233 | B2 | 9/2013 | McIntyre |
| 2003/0219252 | A1 | 11/2003 | Hays |
| 2007/0109528 | A1* | 5/2007 | Caldwell ................ B64D 43/00 356/28 |
| 2007/0171397 | A1* | 7/2007 | Halldorsson ............ G01S 17/95 356/28.5 |
| 2011/0164783 | A1* | 7/2011 | Hays ........................ G01S 17/58 382/100 |
| 2011/0181864 | A1* | 7/2011 | Schmitt ................... G01S 17/95 356/28 |
| 2011/0188029 | A1* | 8/2011 | Schmitt ................... G01S 17/95 356/28 |
| 2012/0078540 | A1* | 3/2012 | McIntyre ................. G01P 5/16 702/50 |
| 2014/0192356 | A1 | 7/2014 | Antikainen et al. |
| 2016/0084945 | A1 | 3/2016 | Rodrigo et al. |

OTHER PUBLICATIONS

European Patent Office, "Communication pursuant to Article 94(3) EPC from EP Application No. 17154069.3 dated Nov. 30, 2017", from Foreign Counterpart of U.S. Appl. No. 15/171,502, dated Nov. 30, 2017, pp. 16, Published in: EP.

European Patent Office, "Extended European Search Report from EP Application No. 17154069.3 dated Apr. 24, 2017", "from Foreign Counterpart of U.S. Appl. No. 15/171,502", dated Apr. 24, 2017, pp. 18, Published in: EP.

European Patent Office; "Communication pursuant to Article 94(3) EPC from EP Application No. 17154069.3 dated Apr. 17, 2018"; from Foreign Counterpart of U.S. Appl. No. 15/171,502; dated Apr. 17, 2018; pp. 1-5; Published: EP.

\* cited by examiner

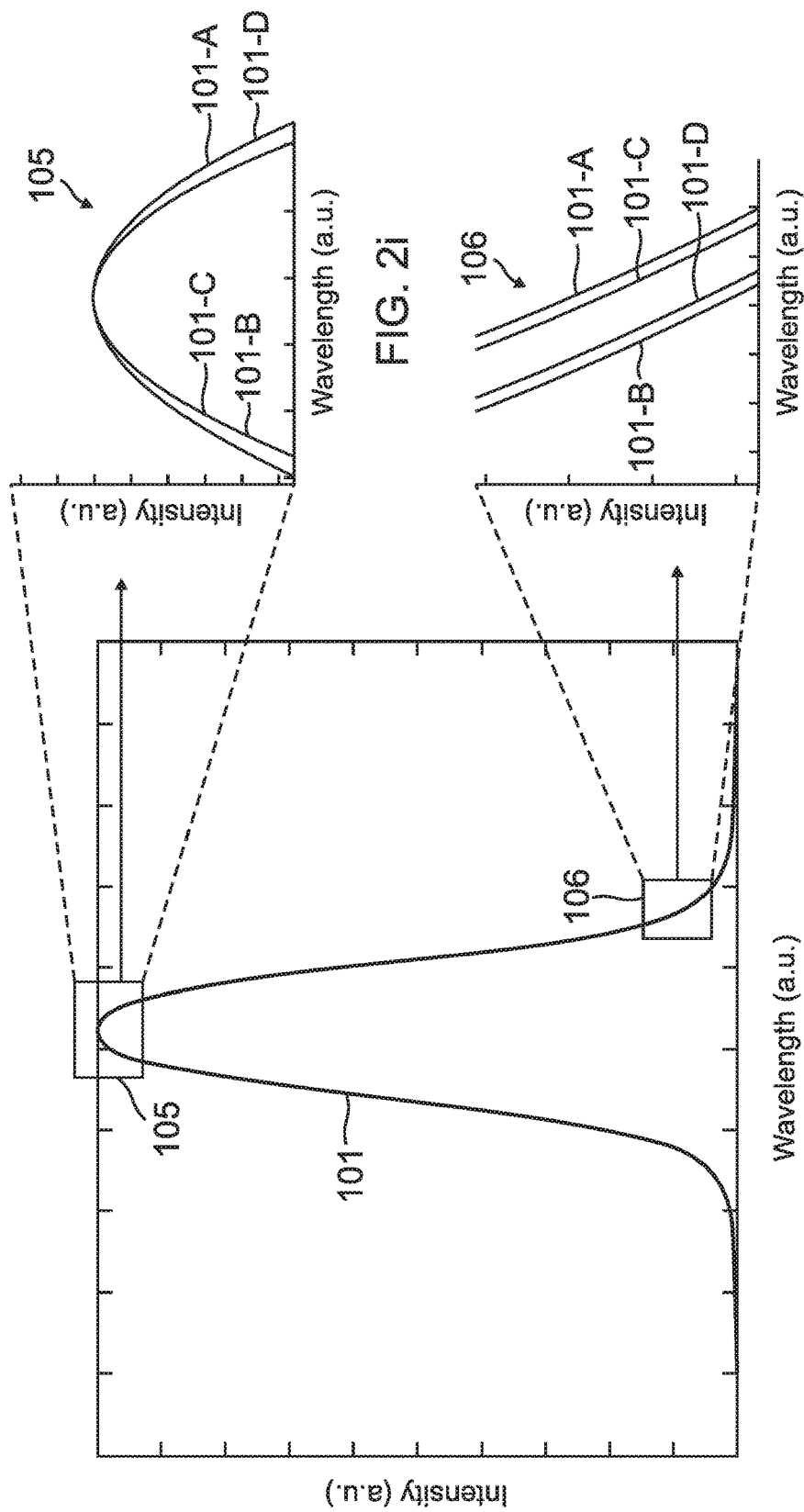

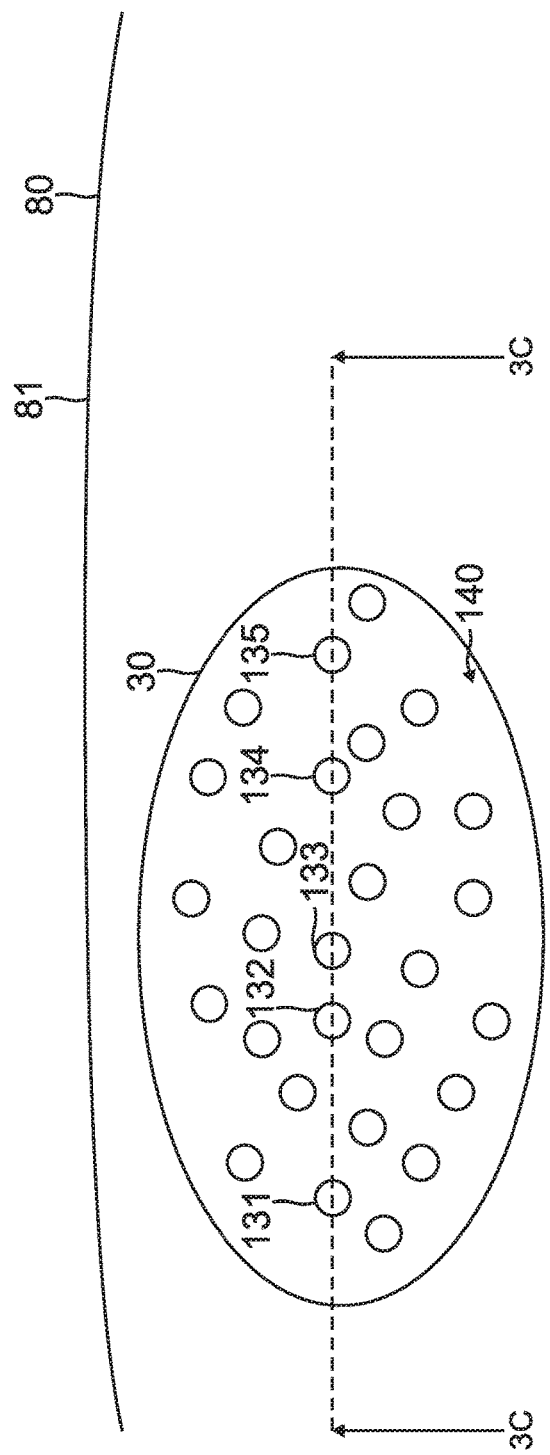
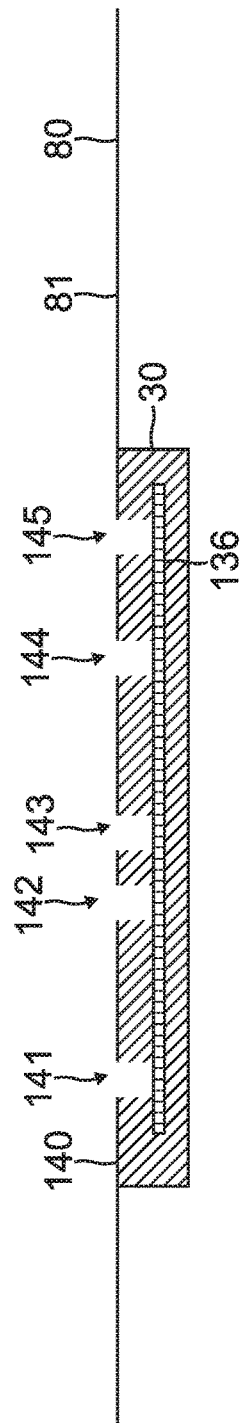
FIG. 3B
FIG. 3C

ENHANCED LIDAR AIR DATA USING SUPPLEMENTARY SENSOR OUTPUTS

This application claims the benefit of U.S. Provisional Application No. 62/300,190 filed on Feb. 26, 2016, which is incorporated herein by reference in its entirety.

BACKGROUND

Conventional fixed wing aircraft rely on an ensemble of legacy air data sensors to obtain critical air data measurands required for the flight management system, and cockpit instruments and displays. A measurand is a physical quantity or property which is measured, such as total air temperature or static pressure. Some of these sensors suffer from long-term stability problems, most notably the pitot and pitot-static probes which are susceptible to failure caused by icing or other obstructions. Although much research and development has been dedicated to overcoming the shortcomings of these sensors, the fundamental limitations still remain. Recently, Light Detection and Ranging (LiDAR, also LIDAR or LADAR) has been identified as a potential technology platform for air data acquisition that circumvents the stability problems of pitot based sensors.

LiDAR remotely interrogates a volume of free stream air. An optical beam is emitted from a laser and the backscattered optical beam is analyzed to derive air data parameters. The emitted optical beam that is backscattered from the volume of air is referred to as a backscattered reflection of the optical beam.

The optical beam can be reflected based on Mie scattering only, Rayleigh scattering only, or a combination of Mie scattering and Rayleigh scattering. As is known to one skilled in the art, the Mie solution to Maxwell's equations (also known as the Lorenz-Mie solution, the Lorenz-Mie-Debye solution, or Mie scattering) describes the (scattering of an electromagnetic plane wave by a homogeneous sphere. The solution takes the form of an infinite series of spherical multipole partial waves. As is known to one skilled in the art, Rayleigh scattering describes the elastic scattering of light by spheres that are much smaller than the wavelength of light. Rayleigh scattering has a strong wavelength dependence and increases rapidly with decreasing wavelength.

The air data parameters derived from the analysis of the backscattered reflection of the optical beam include, but are not limited to, true air speed vector, true air temperature, and static pressure. The air speed vector is derived from the Doppler shift of the backscattered return. The air temperature and air pressure are derived from the lineshape of the backscattered spectrum. Because the LiDAR optical sensor head can be flush mounted to the aircraft vehicle and fully enclosed in the interior, it circumvents the reliability and aerodynamic drag issues encountered by extruding pitot tubes and temperature sensors. Furthermore, there are no fundamental limitations of reduced accuracy at high angles of attack or low velocity. Due to these many advantages, LiDAR technology is seemingly well positioned to displace the antiquated Legacy air data technology.

FIG. 1 shows a common LiDAR backscatter lineshape 100 for Mie scattering and Rayleigh scattering. Mie scattering and Rayleigh scattering both contribute to the LiDAR backscatter lineshape 100. The LiDAR backscatter lineshape 100 includes the Mie scattered contribution (i.e., an aerosol peak 102), which protrudes from the generally bell-shaped portion of the LiDAR backscatter lineshape 100.

Airspeed, which is related to the velocity of a moving vehicle, is derived from the Doppler shift between the center frequency $v_1$, of the LiDAR backscattered signal and the laser frequency $v_2$. The Doppler shift is proportional to the $\Delta v = (v_1 - v_2)$ (FIG. 1). The center frequency is $v_1$ and $v_2$ is the frequency of the LiDAR backscattered optical beam. The laser frequency $v_2$ is the frequency of the beam emitted by the laser in the LiDAR system.

Both the air temperature and the air pressure are convolved (convoluted) in the molecular linewidth of the LiDAR backscattered spectrum (i.e., the LiDAR backscatter lineshape 100, which is also referred to as the molecular lineshape 100). The width (W) of the molecular lineshape 100 is dictated by the air temperature. The intensity (i.e., the area under the curve) of the molecular lineshape 100 is dictated by the density, which is directly related to the air pressure. Typically, a model is used to fit and subsequently deduce the air data parameters from the molecular lineshape 100. The air temperature and air pressure are interrelated via the well known ideal gas law (PV=nRT), which makes it difficult to determine the source of any deviations in the LiDAR backscattered lineshape 100. It is difficult to deconvolve (deconvolute) the signal into accurate air data measurands. The backscattered signal is often noisy, which makes it more difficult to resolve small changes in air temperature and air pressure.

FIG. 2 shows simulations of four almost overlapping normalized LiDAR backscattered lineshapes 101-A, 101-B, 101-C, and 101-D for four respective different air pressure and temperature conditions. The overlapping normalized LiDAR backscattered lineshapes 101-A, 101-B, 101-C, and 101-D are represented in combination as 101 (FIG. 2). The lineshapes 101-A, 101-B, 101-C, and 101-D are simulated for Rayleigh scattering only.

FIG. 2i is an expanded view of a peak region 105 of the LiDAR backscattered lineshapes 101-A, 101-B, 101-C, and 101-D of FIG. 2. FIG. 2ii is an expanded view of a minimal region 106 of the LiDAR backscattered lineshapes 101-A, 101-B, 101-C, and 101-D of FIG. 2. In FIGS. 2, 2i, and 2ii, the exemplary lineshapes 101-A, 101-B, 101-C, and 101-D shown in FIGS. 2, 2i, and 2ii are ideal molecular line shapes with no noise.

The LiDAR backscattered lineshape 101-A is obtained when the measured temperature is 263.15° K and the measured pressure is 0.6 atmospheres. The LiDAR backscattered lineshape 101-B is obtained when the measured temperature is 273.15° K and the measured pressure is 0.5 atmospheres. The LiDAR backscattered lineshape 101-C is obtained when the measured temperature is 263.15° K and the measured pressure is 0.5 atmospheres. The LiDAR backscattered lineshape 101-D is obtained when the measured temperature is 273.15° K and the measured pressure is 0.6 atmospheres.

As shown in FIG. 2i, the shapes of the LiDAR backscattered lineshapes 101-A and 101-D overlap with each other but are separate from the LiDAR backscattered lineshapes 101-C and 101-B. The shapes of the LiDAR backscattered lineshapes 101-B and 101-C overlap with each other. As shown in FIG. 2ii, the shapes of the LiDAR backscattered lineshapes 101-A, 101-B, 101-C, and 101-D do not overlap. In FIG. 2ii, the LiDAR backscattered lineshapes 101-A and 101-C are closer to each other than they are to the LiDAR backscattered lineshapes 101-B and 101-D. In FIG. 2ii, the LiDAR backscattered lineshapes 101-B and 101-D are relatively close to each other.

It is clear, from FIGS. 2, 2i, and 2ii, that changes in pressure and temperature (i.e., $\Delta T$ of 10° K and/or $\Delta P$ of 0.1 atmosphere) result in subtle changes in the lineshape. The subtlety of the changes makes it difficult to extract highly accurate data parameters. As defined herein, high accuracy or accuracy is the accuracy consistent with commercial aircraft requirements. When noise, which is inherent in sensor systems, is added to the lineshape, accurate deconvolution of the lineshape is even more difficult. FIGS. 2i and 2ii clearly show why current state-of-the-art LiDAR systems have difficulty in achieving highly accurate total air temperature and static air pressure measurements for air data application. This inaccuracy limits the attractiveness of current state-of-the-art LiDAR data systems as a sole replacement for Legacy air data sensors.

SUMMARY

The present application relates to a method of enhancing LiDAR data. The method includes inputting LiDAR data from at least one LiDAR sensor; inputting data from at least one of: at least one static pressure sensor; and at least one total air temperature sensor; and extracting accurate air data parameters by processing one of: the LiDAR data and static pressure data from the static pressure sensor; the LiDAR data and true temperature data from the total air temperature sensor; or the LiDAR data, the static pressure data from the static pressure sensor, and the true temperature data from the total air temperature sensor. The method also includes generating augmented air data based on the extracted accurate air data parameters and outputting the augmented air data.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 shows simulations of four almost overlapping normalized LiDAR backscattered lineshapes for four respective different air pressure and temperature conditions;

FIG. 2i is an expanded view of a peak region of the LiDAR backscattered lineshapes of FIG. 2;

Figure 3A:
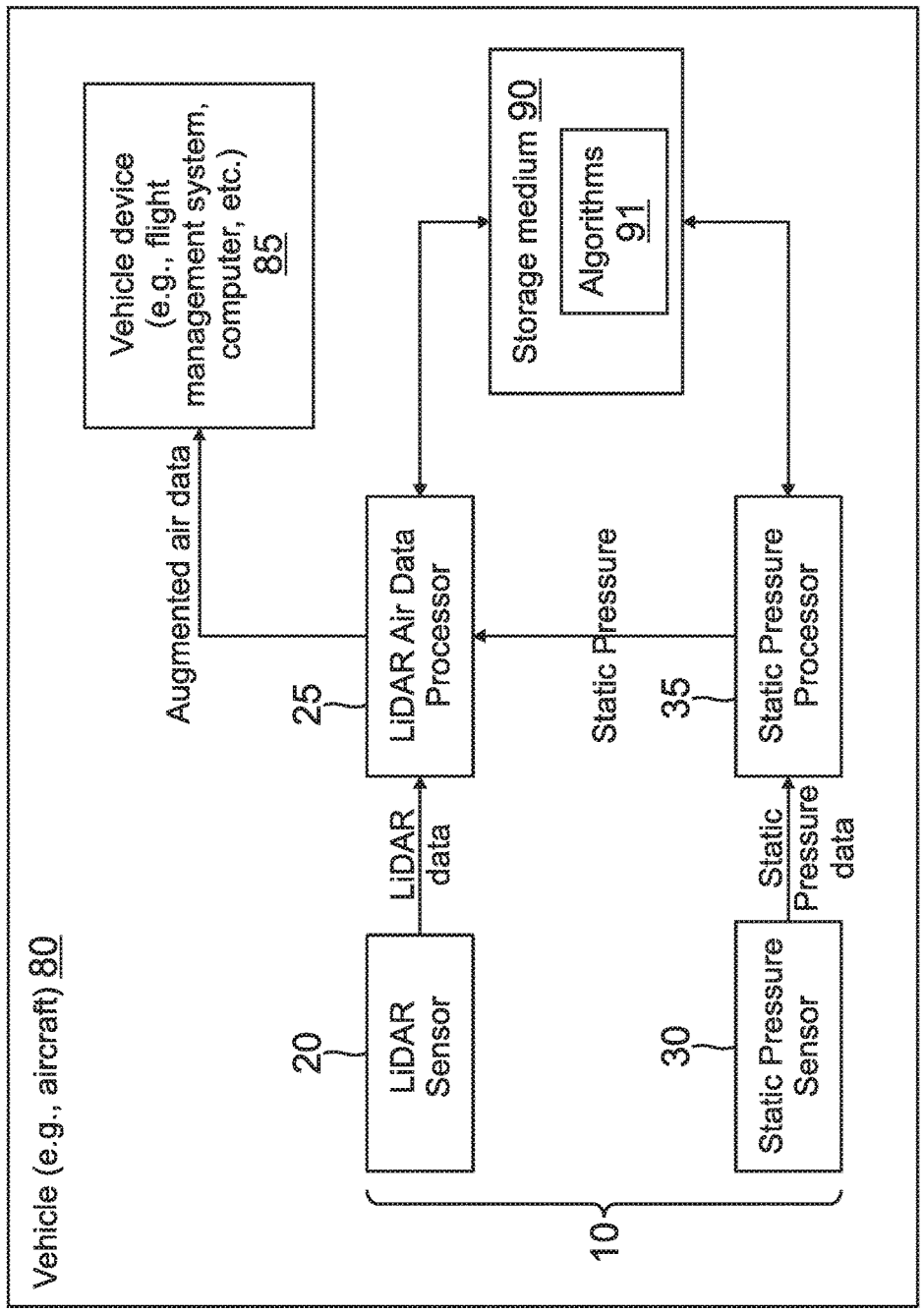
Figure 4:
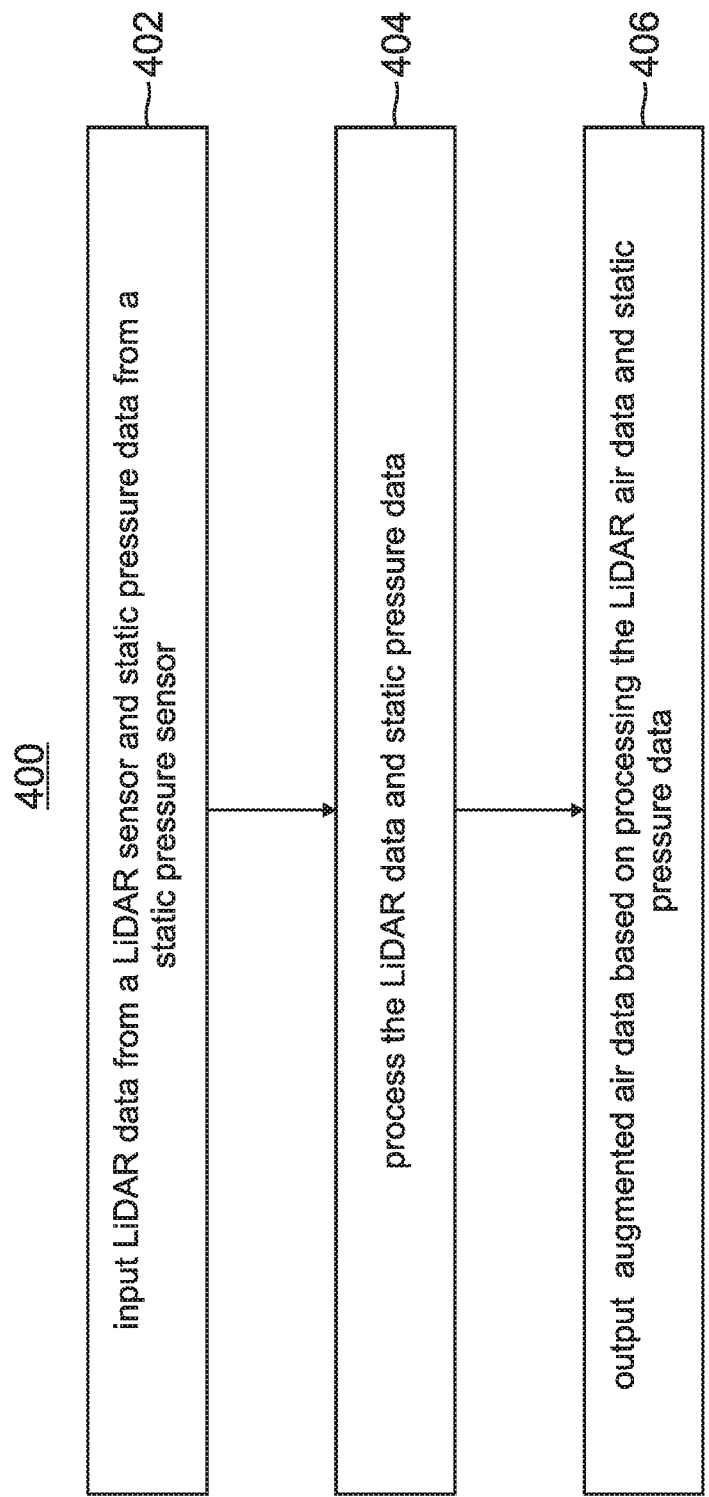
Figure 5:
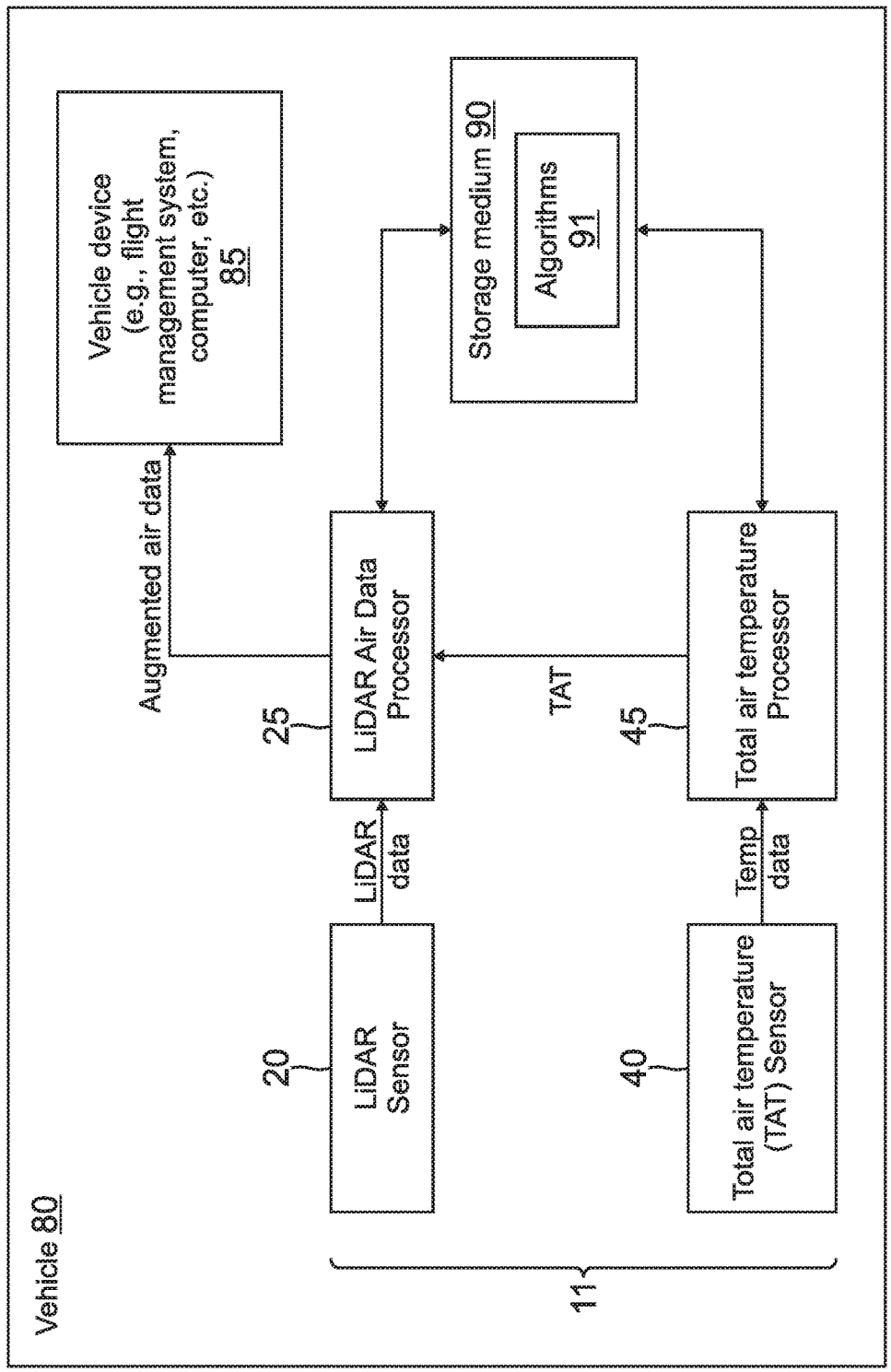
Figure 6:
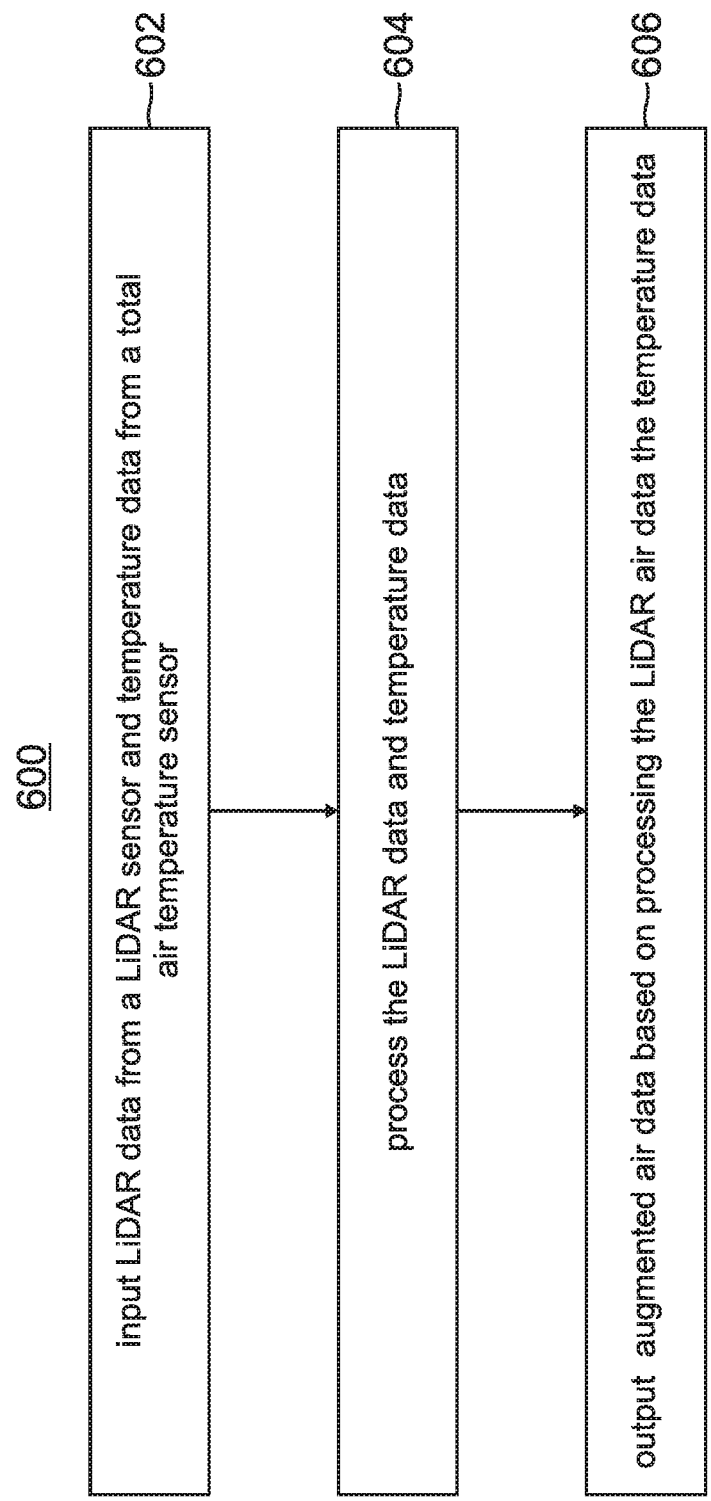
Figure 7:
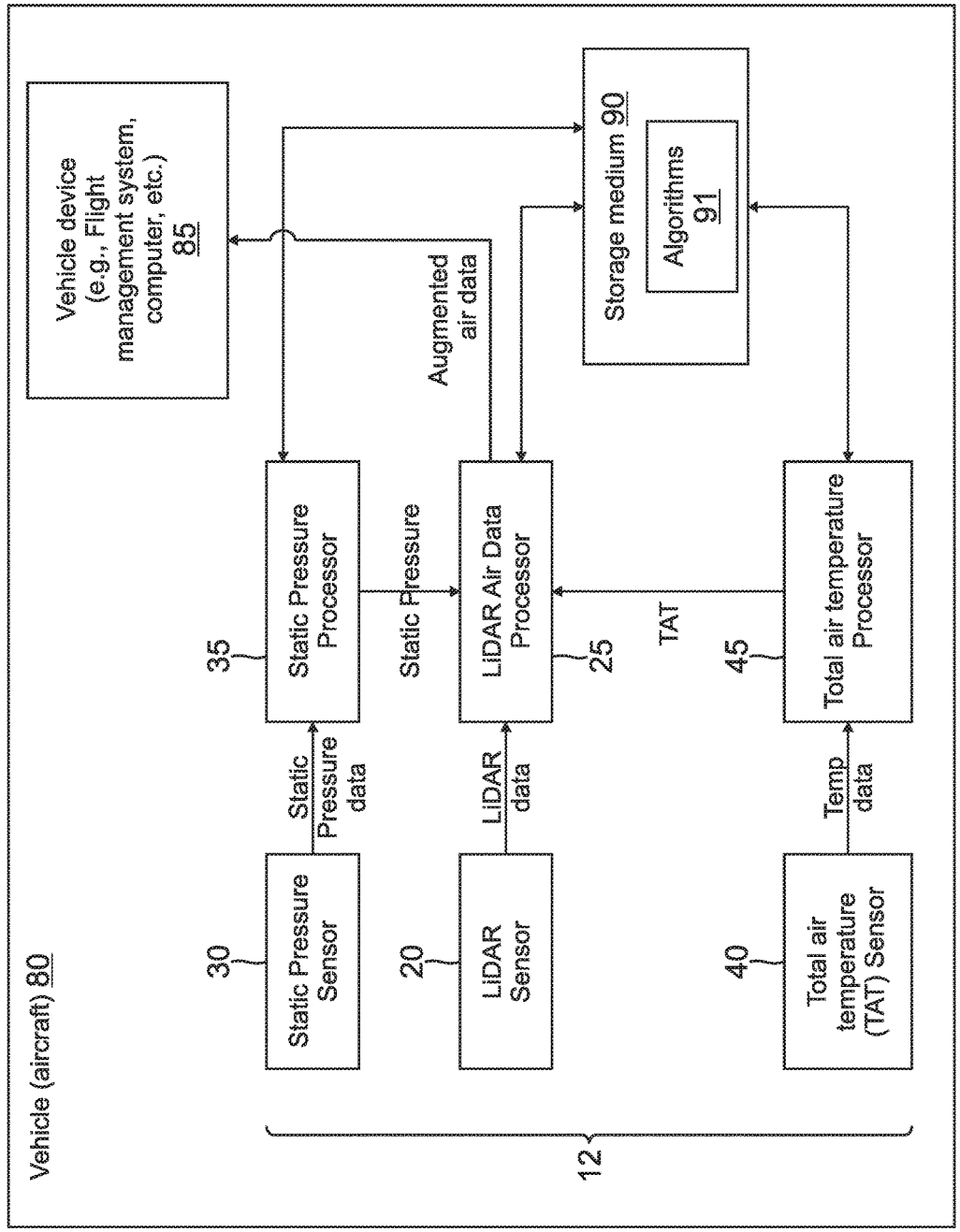
Figure 8:
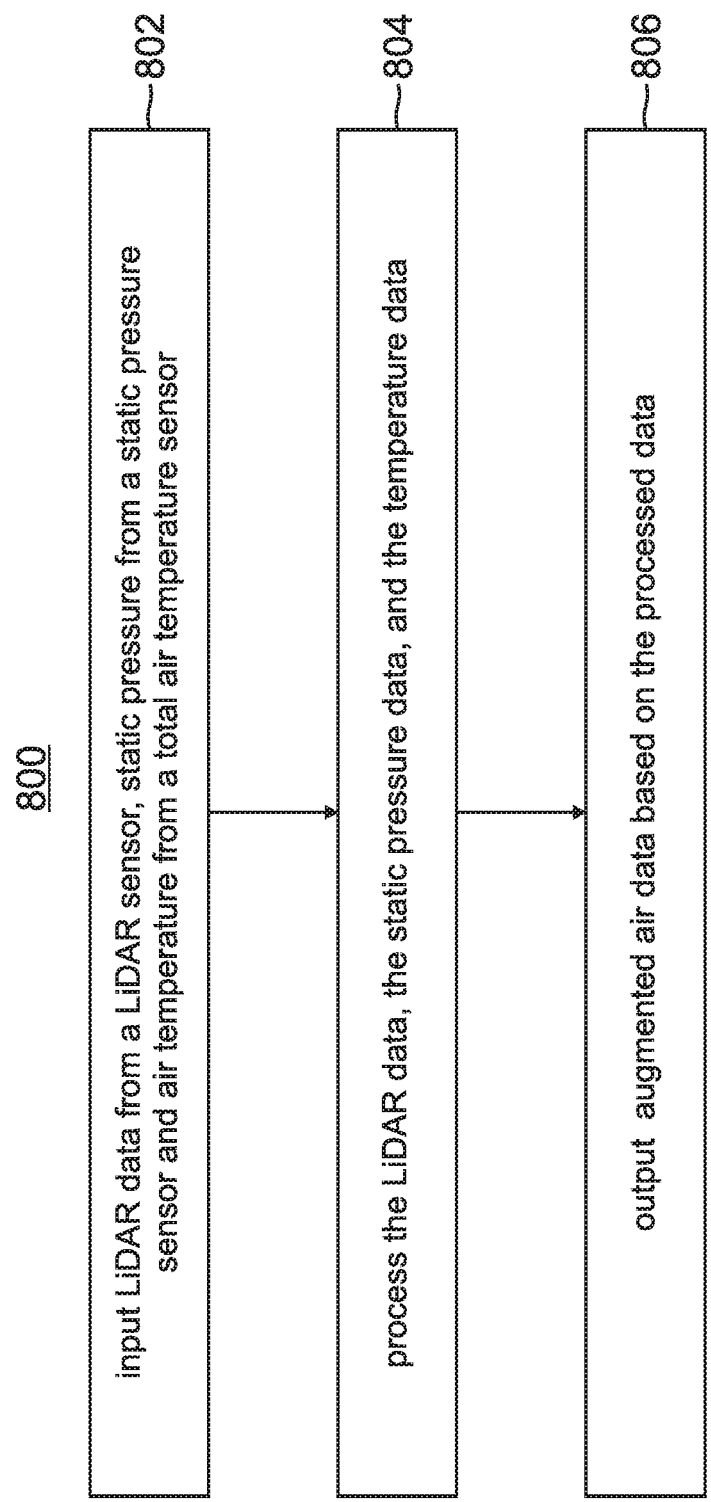
Figure 9:
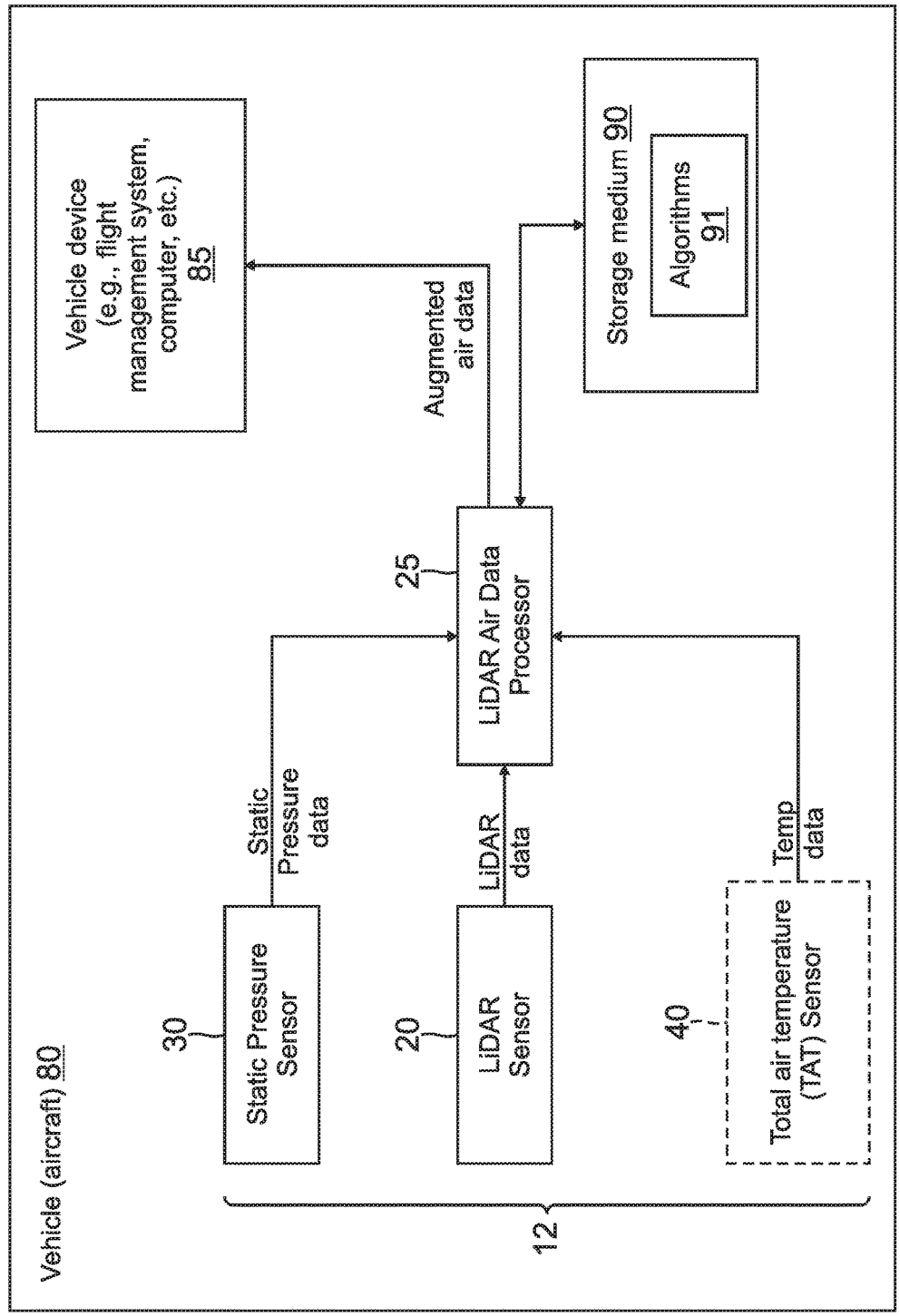
Figure 10:
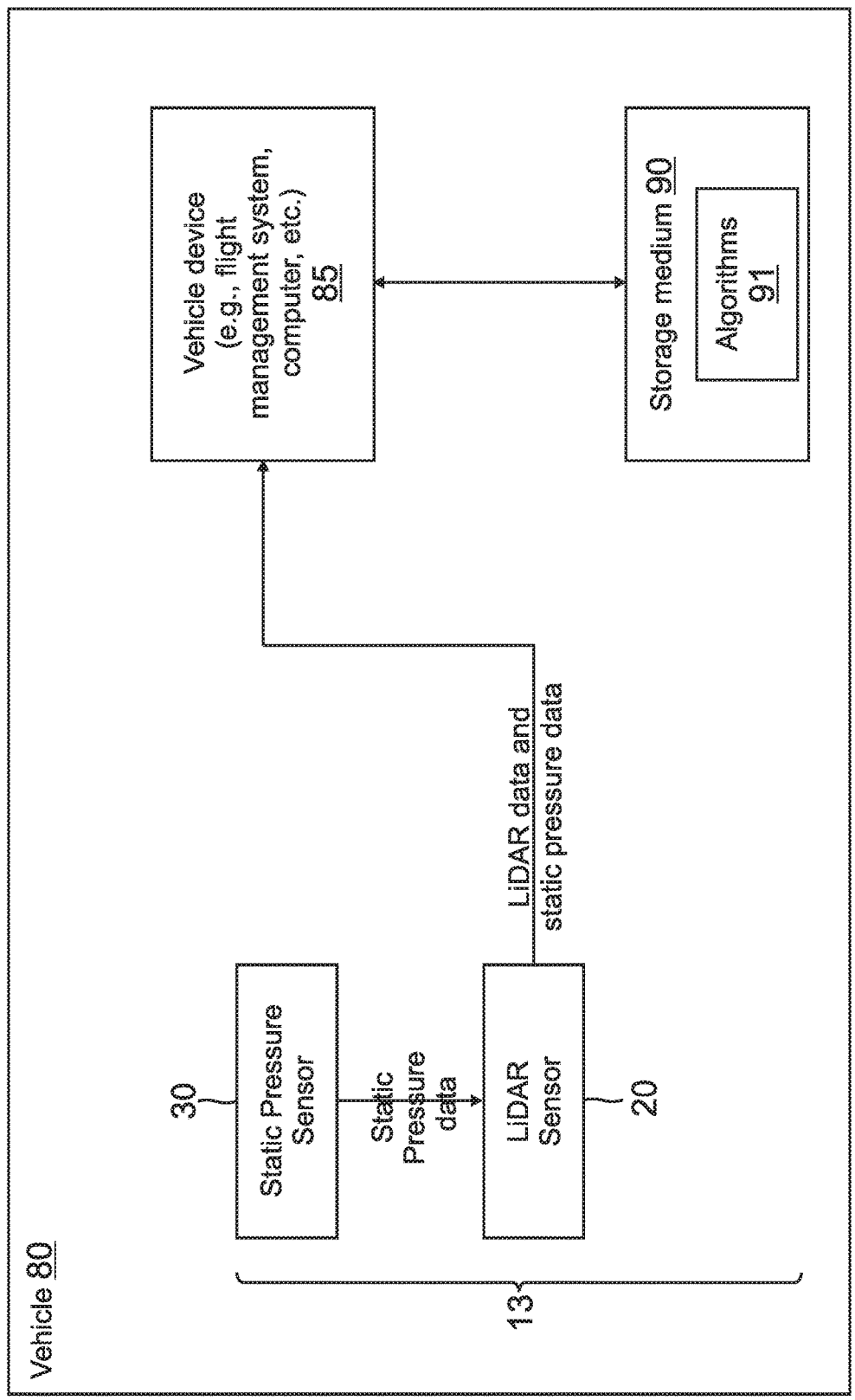
Figure 11:
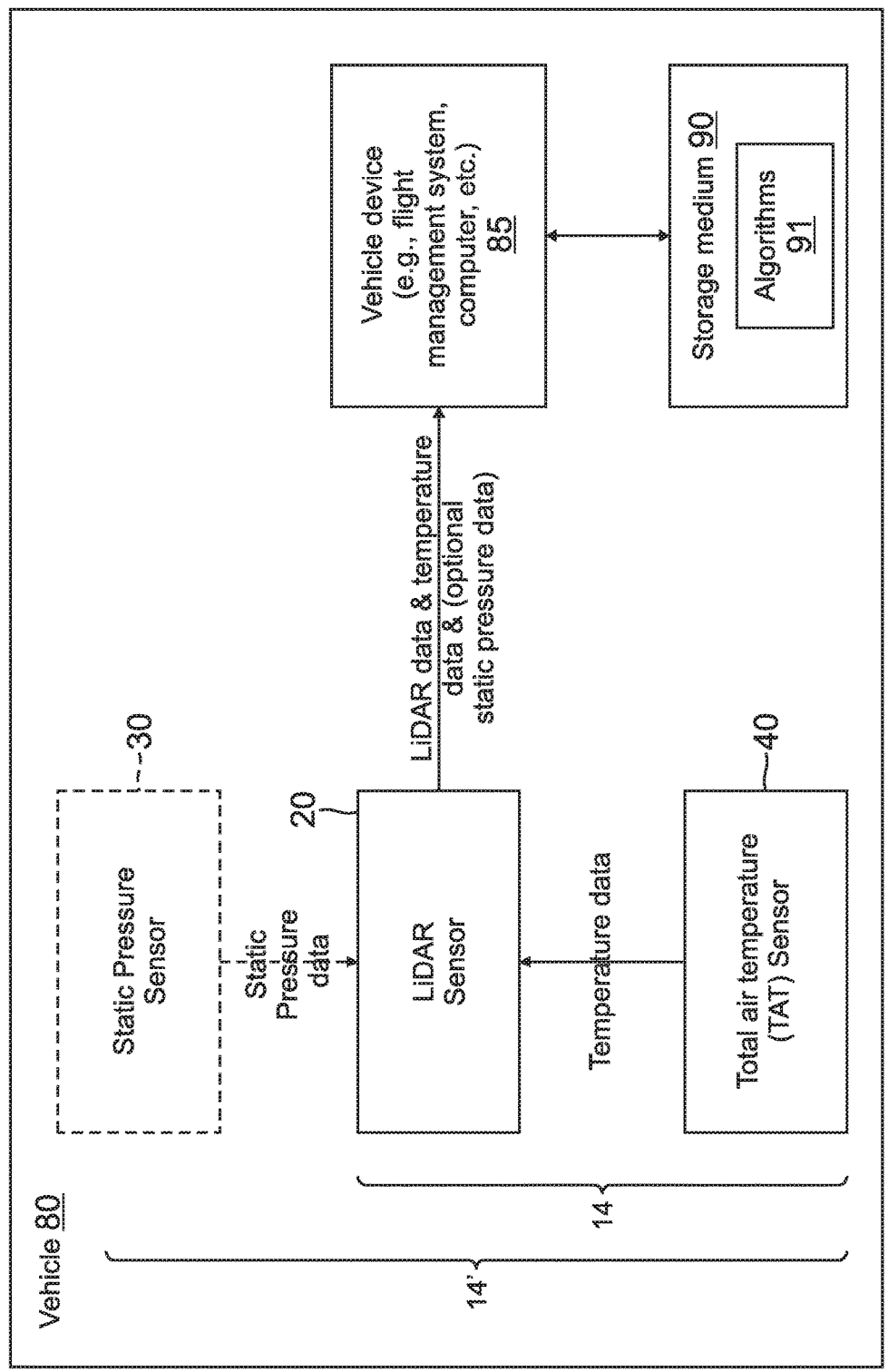
Figure 12:
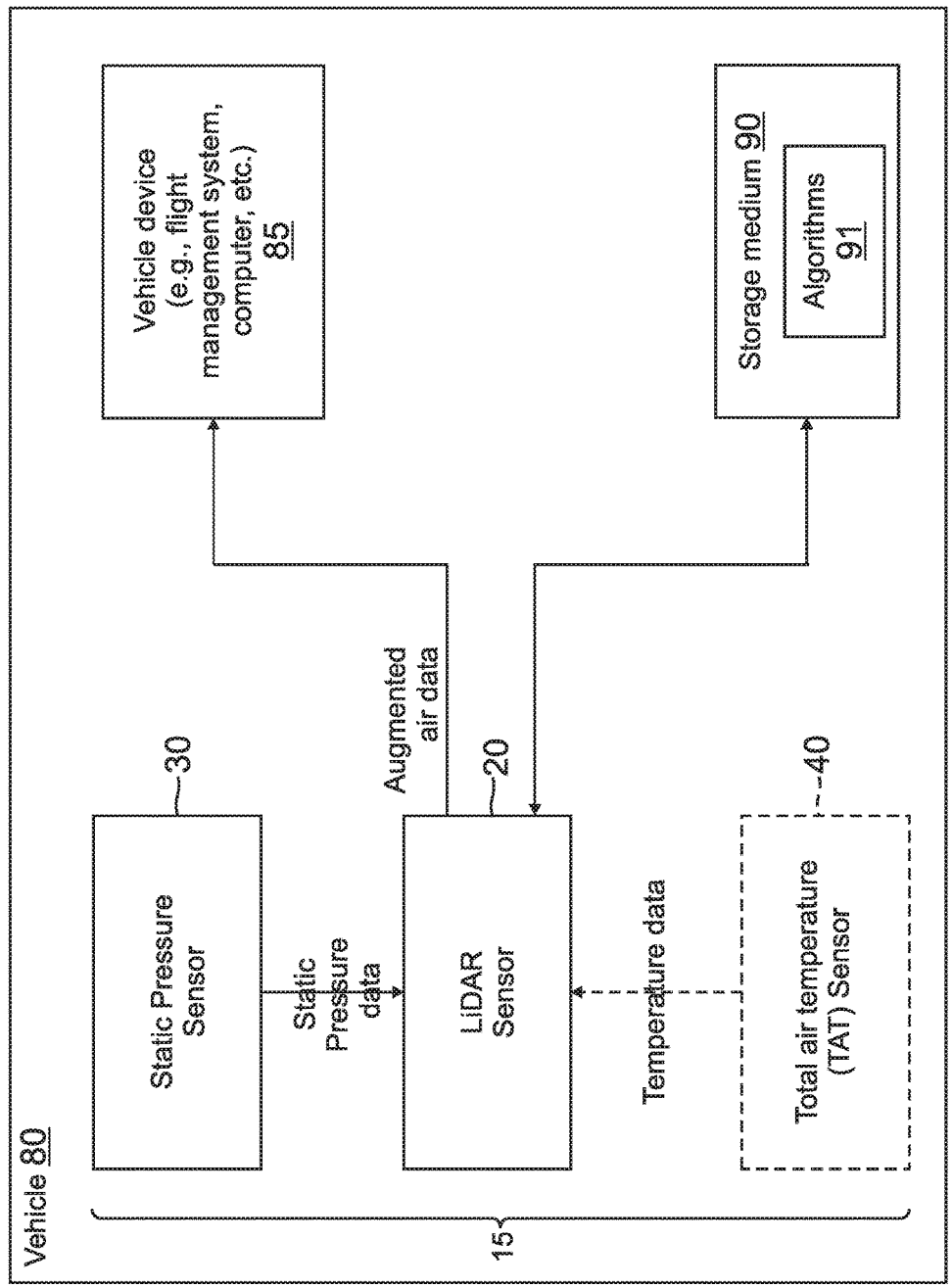

FIG. 2ii is an expanded view of a minimal region of the LiDAR backscattered lineshapes of FIG. 2;

FIG. 3A shows an embodiment of a system to enhance LiDAR data using supplementary static pressure sensor outputs in accordance with the present application;

FIG. 3B shows a top view of an embodiment of a flush orifice static pressure sensor in accordance with the present application;

FIG. 3C shows a cross-sectional side view of the flush orifice static pressure sensor of FIG. 3B in accordance with the present application;

FIG. 4 shows a flow diagram of an embodiment of a method to enhance LiDAR data using supplementary static pressure sensor outputs in accordance with the present application;

FIG. 5 shows an embodiment of a system to enhance LiDAR data using supplementary total air temperature sensor outputs in accordance with the present application;

FIG. 6 shows a flow diagram of an embodiment of a method to enhance LiDAR data using supplementary total air temperature sensor outputs in accordance with the present application;

FIG. 7 shows an embodiment of a system to enhance LiDAR data using supplementary static pressure sensor outputs and supplementary total air temperature sensor outputs in accordance with the present application;

FIG. 8 shows a flow diagram of an embodiment of a method to enhance LiDAR data using supplementary static pressure sensor outputs and supplementary total air temperature sensor outputs in accordance with the present application;

FIG. 9 shows an embodiment of a system to enhance LiDAR data using supplementary static pressure sensor outputs and optional supplementary total air temperature sensor in accordance with the present application;

FIG. 10 shows an embodiment of a system to enhance LiDAR data using supplementary static pressure sensor outputs in accordance with the present application;

FIG. 11 shows an embodiment of a system to enhance LiDAR data using supplementary total air temperature sensor outputs and optional supplementary static pressure sensor in accordance with the present application; and FIG. 12 shows an embodiment of a system to enhance LiDAR data using supplementary static pressure sensor and optional supplementary total air temperature sensor outputs in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments of systems and methods described below overcome the above mentioned problems with noise in a LiDAR backscattered lineshape resulting in inaccuracies in the measured air data.

The air data systems described herein sense quantities associated with the respective sensor type (i.e. LiDAR system measures backscattered light, temperature sensors measure total air temperature, etc.) and process this sensed data into air data parameters such as airspeed, true air temperature, and/or static pressure. The extracted air data from the total air temperature sensor processor, static pressure sensor processor, or both the total air temperature sensor and static pressure sensor is used to enhance the fit of the LiDAR backscatter lineshape in the LiDAR processor. The improved fitting of data to the LiDAR backscatter lineshape is achieved by reducing the degrees of freedom of the fit by inputting known values for static pressure, true air temperature, or both static pressure and true air temperature. The improved fit of the LiDAR backscatter lineshape increases the accuracy of the air data output from the LiDAR system processor. The accurate air data parameters are referred to herein as "augmented air data" or "enhanced air data".

The augmented air data is post-processed to provide critical parameters for control of the vehicle (e.g., the aircraft). The critical parameters for control of the vehicle include, but are not limited to, vehicle altitude, true air speed, Mach number, rate of climb, rate of descent, angle of side slip, and angle of attack. These critical parameters for control of the vehicle are improved (more accurate) than they would be if the sensed airspeed, air temperature and/or static pressure had not been enhanced using the techniques described herein.

In one implementation of this embodiment, a vehicle computer post-processes the augmented air data to compute on the critical parameters for control of the vehicle. The term "post-processing" as used herein, refers to processing done on the extracted accurate air data parameters to generate critical parameters for control of a vehicle. In one implementation of this embodiment, the enhanced air data is sent to a vehicle device. In this case, the vehicle device uses the augmented air data to convert the pressure values to altitude and internally derive all of the critical parameters for control of the vehicle. The critical parameters for control of the vehicle are then delivered to a flight management system (or computer) on the vehicle. The critical parameters are used by the flight management system (or computer) to control the vehicle.

The post-processing can be done by a partition in the flight control processing functionality of a commercial aircraft. The post-processing can be done in a mission computer on a military aircraft. The post-processing can be done by a line replaceable unit (LRU) or an air data computer that internally derives both the enhanced air data and the critical parameters for control of the vehicle.

FIG. 3A shows an embodiment of a system 10 to enhance LiDAR data using supplementary static pressure sensor outputs in accordance with the present application. System 10, which is operationally positioned (i.e., housed) in a vehicle 80, includes a LiDAR sensor 20 (also referred to herein as a LiDAR data sensor 20), a static pressure sensor 30, and a storage medium 90 including algorithms 91, which are executable by at least one processor. System 10 also includes a LiDAR air data processor 25 and a static pressure processor 35. The LiDAR air data processor 25 and the static pressure processor 35 are optional. In one implementation of this embodiment, the vehicle 80 is an aircraft. In another implementation of this embodiment, the vehicle 80 is a water-based vehicle. In yet another implementation of this embodiment, the vehicle 80 is a land-based vehicle.

The static pressure data is output from the static pressure sensor 30 to the static pressure processor 35. The static pressure processor 35 executes at least one of the algorithms 91 to improve the static pressure data. The data output from the pressure sensor 30 may pick up some error terms due to the movement of the vehicle 80. For example, errors can be introduced in the static pressure data due to the angle of attack and air speed. The static pressure processor 35 removes these errors from the static pressure data so the static pressure data is more accurate then the data output from the static pressure processor 35. This improved static pressure data, which is referred to herein as static pressure, is output to the LiDAR air data processor 25 for additional processing.

In one implementation of this embodiment, the static pressure sensor 30 is a flush orifice static pressure sensor 30. FIG. 3B shows a top view of an embodiment of a flush orifice static pressure sensor 30 in accordance with the present application. FIG. 3C shows a cross-sectional side view of the flush orifice static pressure sensor 30 of FIG. 3B in accordance with the present application. The plane upon which the cross-section view of FIG. 3C is taken is indicated by section line 3C-3C in FIG. 3B. As shown in FIG. 3C, the flush orifice static pressure sensor 30 is flush with the skin 81 of the external body of the vehicle 80. The surface 150 of the flush orifice static pressure sensor 30 is in the plane (or approximately in the plane) of the skin 81 of the vehicle 80. A plurality of holes represented generally at 131-135 (FIG. 3B) on the surface 140 of the flush orifice static pressure sensor 30 provide openings 131, 132, 133, 134, and 135 on the surface 140 to respective cavities 141, 142, 143, 144, and 145 in the flush orifice static pressure sensor 30. The cavities 141, 142, 143, 144, and 145 extend to a structure 136 in the flush orifice static pressure sensor 30. The structure 136 includes components and/or circuits to sense static pressure (also referred to herein as pressure) and to output signals that carry information indicative of static pressure data. In one implementation of this embodiment, the structure 136 includes components and/or circuits to process the sensed pressure. Other configurations of flush orifice static pressure sensors 30 are possible as is known in the art.

In one implementation of this embodiment, system 10 (FIG. 3A) includes at least one flush orifice static pressure sensor 30, which advantageously reduces drag on the vehicle 80 and avoids problems of failure inherent with other sources of static pressure, such as pitot-static probes. In another implementation of this embodiment, the static pressure sensor 30 is a pitot-static probe.

The LiDAR data sensor 20 captures backscattered return data which is evaluated in the LiDAR air data processor 25. The data from the LiDAR sensor 20 includes information indicative of the backscattered return signal input at the LiDAR sensor 20 that has a LiDAR backscatter lineshape 100. The data from the LiDAR sensor 20 is output to the LiDAR air data processor 25. The information indicative of the backscattered return signal is referred to herein as "LiDAR data".

The LiDAR air data processor 25 executes at least one of the algorithms 91 on the LiDAR data from the LiDAR sensor 20 to process the backscattered return signal. The LIDAR air data processor 25 processes the LiDAR data and the static pressure to facilitate a fit of the LiDAR backscatter lineshape 100 to extract the accurate air data parameters. The LiDAR air data processor 25 generates augmented air data based on the extracted accurate air data parameters. The algorithms 91 executed by the LiDAR air data processor 25 on the data from the LiDAR sensor 20 and the static pressure input from the static pressure processor 35 provide an output that is a blend of the sensor suite (i.e., the LiDAR sensor and the static pressure sensor 30) to provide accurate air speed vector, air temperature and air pressure measurements while still retaining many of the benefits of the LiDAR data sensor technology including accuracy at high angles of attack and accuracy at low velocity.

Figure 1:
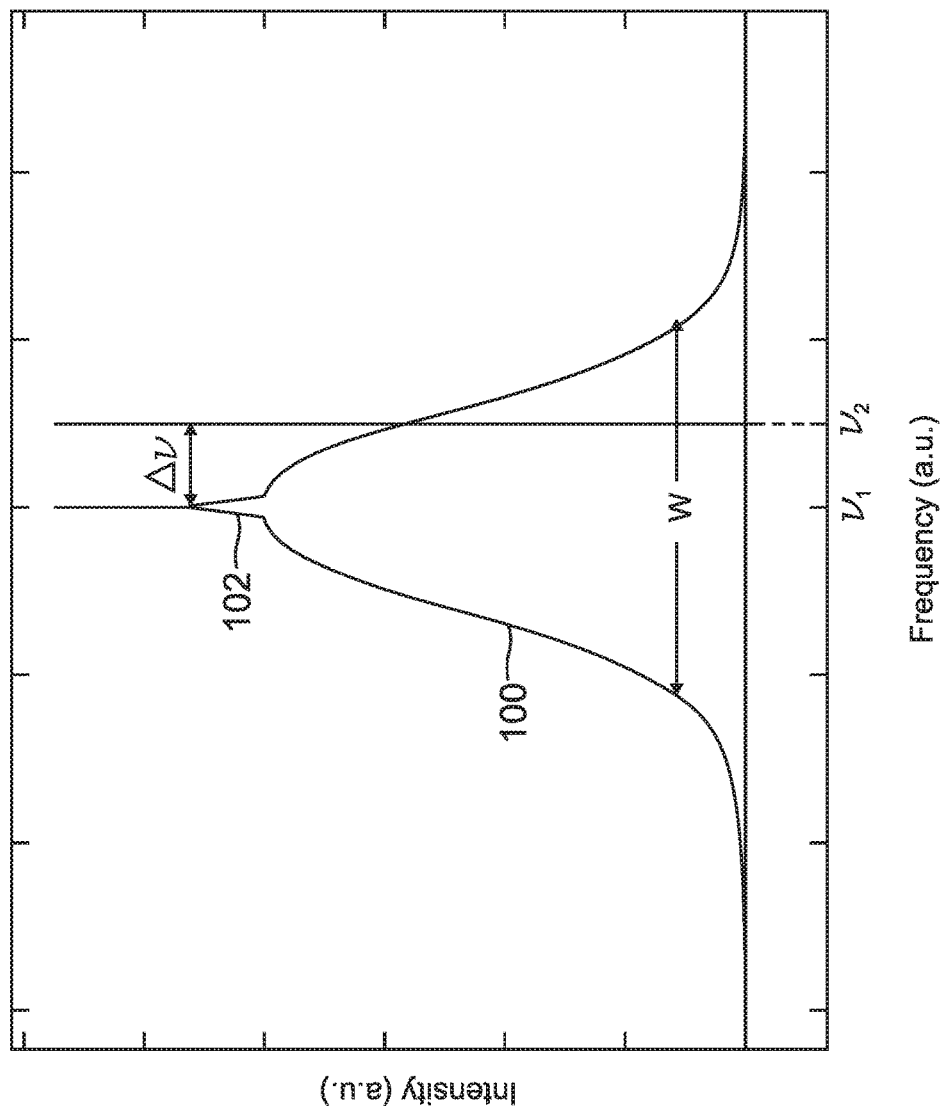
FIG. 1 shows a common LiDAR backscatter lineshape for Mie scattering and Rayleigh scattering.

As defined herein, augmented air data includes air data parameters of true air speed vector, true air temperature, and static pressure. Other parameters can be included in the augmented air data. The terms "true air speed vector", "true air temperature", and "static pressure" are used since the air speed vector, the temperature, and the pressure obtained using the technology described herein is more accurate than the air speed vector, the temperature, and the pressure obtained using a prior art LiDAR data system. As described above with reference to FIGS. 1 and 2, a prior art LiDAR data system does not fit accurate pressure data to the lineshape 100 and is incapable of accurately distinguishing between pressure and temperature due to noise in the LiDAR backscatter lineshape collected by a LiDAR data sensor.

Static pressure is input in to the LiDAR air data processor 25 to facilitate in the measurement of air temperature by providing a known reference for air pressure. A generic representation of the model (M) commonly used for fitting the molecular lineshape is: $M=f(P, T, L_p, D, V_s, m, r \ldots)$, where f is a function containing the variables $P, T, L_p, D, V_s$, m and r that represent the air pressure, air temperature, laser properties, Doppler shift, sampling volume of the LiDAR system, Mie scattering, and Rayleigh scattering, respectively. The ellipsis shown within the parameters of the model function indicates other variables (parameters) are contained within the function f. The three variables of interest in the function f are P, T and D for air data measurands. Limiting the quantity of unknowns in f is paramount in realizing an accurate fit of M to the backscattered lineshape. Other variables in f can be inferred by knowledge of the LiDAR system and components. Thus, if pressure is a known parameter, it reduces the degrees of freedom of the fit of M to the LiDAR backscatter data. A similar approach can be used to extract more accurate measurements of other air data parameters by inputting known parameters from other sensors to the model (as shown in FIG. 5, which is described below). Advantageously, this approach can be used for any model or data extraction method. In other words, this technique works for any function of $f(P, T, L_p, D, V_s, m, r \ldots)$.

In one implementation of this embodiment, the function $f(P, T, L_p, D, V_s, m, r \ldots)$ is a quasi-Gaussian distribution. In another implementation of this embodiment, the function $f(P, T, L_p, D, V_s, m, r \ldots)$ is based on the Tenti model, which is a model known to one skilled in art. The technique described herein can be implemented with any model, currently known or developed in the future, which is formulated to generate a plot that fits a plurality of air data and system parameters including, but not limited to, a plurality of the following: air pressure; air temperature; laser properties; Doppler shift; sampling volume of the LiDAR system; Mie scattering cross section; and/or Rayleigh scattering cross section.

The algorithms 91 executed by the LiDAR air data processor 25 on the data from the LiDAR sensor 20 and the static pressure input from the static pressure processor 35 provide an output that is a blend of the sensor suite (i.e., the LiDAR sensor and the static pressure sensor 30) to provide accurate air speed vector, air temperature and air pressure measurements while still retaining many of the benefits of the LiDAR data sensor technology including accuracy at high angles of attack, accuracy at low velocity, and no aerodynamic drag since the LiDAR and pressure sensors are flush with the skin of the vehicle 80. In this manner, the static pressure is used to augment the algorithms 91 that process the backscattered return signal to derive the air data parameters of true air speed vector, air temperature, and air pressure among others.

As shown in FIG. 3A, the augmented air data is output to a device 85 on the vehicle 80. In one implementation of this embodiment, the device 85 is a flight management system 85. Other types of devices 85, for example, a computer 85, a navigation unit 85 in a vehicle 80, and an avionics unit 85 in an aircraft 85 can be configured to input the augmented air data from the LiDAR air data processor 25. The critical parameters are generated by the flight management system 85 based on the augmented air data. The critical parameters are used by the flight management system to control the vehicle.

FIG. 4 shows a flow diagram of an embodiment of a method 400 to enhance LiDAR data using supplementary static pressure sensor outputs in accordance with the present application. Method 400 is applicable to system 11 shown in FIG. 3A and any of the embodiments of systems described herein that process LiDAR data and pressure data (static pressure data) to augment the air data.

At block 402, LiDAR data is input from a LiDAR sensor 20 and static pressure data is input from a static pressure sensor 30. In one implementation of this embodiment, the LiDAR data is output from the LiDAR sensor 20 to a LiDAR air data processor 25 and the static pressure data is output from a static pressure sensor 30 to the static pressure processor 35 as shown in FIG. 3A. The static pressure processor 35 outputs static pressure to the LIDAR air data processor 25. Inputting LiDAR data from the at least one LiDAR sensor 20 includes inputting a backscattered return signal, which has the shape of the LiDAR backscattered lineshape 100 shown in FIG. 1 with added noise that is inherent in the LiDAR sensor 20, at the LiDAR air data processor 25. In one implementation of this embodiment, a processor is internal to the LiDAR sensor 20. In that case, the LiDAR data sensed at the LiDAR sensor 20 is input to the processor internal to the LiDAR sensor 20.

At block 404, the LiDAR data and the static pressure data are processed by executing at least one of the algorithms 91. The static pressure data from the static pressure sensor 30 is processed at the static pressure processor 35. This processed static pressure data, referred to herein as static pressure, is then input to the LiDAR air data processor 25 for further processing by the LiDAR air data processor 25.

For system 10 shown in FIG. 3A, processing the LiDAR data includes processing the backscattered return signal at the LiDAR air data processor 23 and processing the static pressure. The LiDAR air data processor 25 inputs the LiDAR data and the static pressure and derives augmented air data. The augmented air data includes air data parameters of a true air speed vector, a true air temperature, and a static pressure (i.e., augmented air data) based on the processing of the LiDAR data and the static pressure data to facilitate a fit of a backscattered return signal to a LiDAR backscatter lineshape. Based on the improved fit of the backscattered return signal to a LiDAR backscatter lineshape, accurate air data parameters at the LiDAR air data processor are extracted. The accurate air data parameters are referred to as augmented air data.

At block 406, the augmented air data is output. As shown in FIG. 5, the augmented air data is output to the vehicle device 85. The augmented air data is used by the flight management system 85 to generate critical parameters. The critical parameters are used by the flight management system 85 to control the vehicle.

The augmented air data is used by a flight management system 85 to generate critical parameters. The critical parameters are used by the flight management system to control the vehicle.

In one implementation of this embodiment, the static pressure data from the static pressure sensor 30 is input directly to the LiDAR air data processor 25 without processing the static pressure data at a static pressure processor 35. In another implementation of this embodiment, the static pressure data from the static pressure sensor 30 is input directly to a LIDAR sensor 20 with an internal processor.

FIG. 5 shows an embodiment of a system 11 to enhance LiDAR data using supplementary total air temperature sensor outputs in accordance with the present application. System 11, which is housed in a vehicle 80, includes the LiDAR sensor 20, a temperature sensor 40 (shown as a total air temperature (TAT) sensor 40), and the storage medium 90 including the algorithms 91. System 11 also includes the LiDAR air data processor 25 and a total air temperature processor 45.

The true temperature data (also referred to and shown as "temperature data") from the temperature sensor 40 is output to the total air temperature processor 45. The total air temperature processor 45 executes at least one of the algorithms 91 to generate total air temperature (TAT) data. The total air temperature data is output to the LiDAR air data processor 25 to the LIDAR air data processor 25.

The LiDAR data from the LiDAR sensor 20 is also output to the LiDAR air data processor 25. The LiDAR air data processor 25 executes at least one of the algorithms 91 on the LiDAR data from the LiDAR sensor 20 and the total air temperature data input from the total air temperature processor 45 to fit the accurate temperature data to the LiDAR backscattered lineshape 100 and to generate augmented air data. The algorithms 91 executed by the LiDAR air data processor 25 on the LiDAR data from the LiDAR sensor 20 and the total air temperature data input from the total air temperature processor 45 provide an output that is a blend of the sensor suite (i.e., the LiDAR sensor and the total air temperature sensor 40) to provide accurate air temperature and air pressure measurements while still retaining many of the benefits of the LiDAR data sensor technology including accuracy at high angles of attack and accuracy at low velocity. In this manner, the total air temperature is used to augment the algorithm 91 that processes the backscattered return signal to derive the air data parameters of true air speed vector, air temperature, and air pressure among others.

The augmented air data is output to a device 85 on the vehicle 80.

FIG. 6 shows a flow diagram of an embodiment of a method 600 to enhance LiDAR data using supplementary sensor data. Method 600 is applicable to system 11 shown in FIG. 5 and any embodiments of system described herein that process LiDAR data and total air temperature to augment the air data.

At block 602, LiDAR data is input from a LiDAR sensor 20 and true temperature data from a total air temperature sensor 40 is input from a total air temperature sensor 40. In the embodiment shown in FIG. 5, the LiDAR data is input from the LiDAR sensor 20 at the LiDAR air data processor 25, and true temperature data from the total air temperature sensor 40 is input to the total air temperature processor 45.

At block 604, the LiDAR data and the true temperature data is processed by executing at least one of the algorithms 91. The true temperature data is first processed at the total air temperature processor 45. The processed true temperature data, referred to herein as total air temperature, is then input to the LiDAR air data processor 25 for processing by the LiDAR air data processor 25.

For system 11 shown in FIG. 5, processing the LiDAR data includes processing the backscattered return signal at the LiDAR air data processor 23 and processing the true temperature data input from the at least one total air temperature sensor 30 at a total air temperature processor 35 to generate total air temperature. The total air temperature is output from the total air temperature processor 35 to the LiDAR air data processor 25.

The LiDAR air data processor 25 inputs the LiDAR data and the total air temperature and derives air data parameters of a true air speed vector, a true air temperature, and a static pressure (i.e., augmented air data) based on the processing of the LiDAR data and the total air temperature to facilitate a fit of a backscattered return signal to a LiDAR backscatter lineshape. Based on the fitting of the backscattered return signal to a LiDAR backscatter lineshape, accurate air data parameters at the LiDAR air data processor are extracted from the improved fit of the backscattered return signal.

In one implementation of this embodiment, the true temperature data from the total air temperature sensor 40 is directly input to the LiDAR air data processor 25. In another implementation of this embodiment, the true temperature data from the total air temperature sensor 40 is directly input to the LIDAR sensor 20, which includes an internal processor.

At block 606, the augmented air data is output. As shown in FIG. 5, the augmented air data is output to the vehicle device 85. The augmented air data is used by the flight management system 85 to generate critical parameters. The critical parameters are used by the flight management system 85 to control the vehicle.

FIG. 7 shows an embodiment of a system 12 to enhance LiDAR data using supplementary static pressure sensor outputs and supplementary total air temperature sensor outputs in accordance with the present application. System 12, which is housed in the vehicle 80, includes the LiDAR sensor 20, the LiDAR air data processor 25, the static pressure sensor 30, the static pressure processor 35, the total air temperature sensor 40, the total air temperature processor 45, and the storage medium 90 including a plurality of algorithms 91. The LiDAR sensor 20, the LiDAR air data processor 25, the static pressure sensor 30, static pressure processor 35, the total air temperature sensor 40, the total air temperature processor 45, the storage medium 90 and the algorithms 91 have a similar structure and function as described above with reference to FIGS. 3A and 5. In this embodiment of system 12, the LiDAR air data processor 25 inputs static pressure data from the static pressure processor 35 and inputs total air temperature from the total air temperature processor 45 to augment the air data. The LiDAR air data processor 25 processes the LiDAR data, the static pressure data, and the total temperature data to fit the accurate temperature data to the LiDAR backscattered lineshape 100 and to generate augmented air data. The LIDAR air data processor 25 outputs the augmented air data, which is used to generate critical parameters. The critical parameters are used by the flight management system 85 to control the vehicle.

FIG. 8 shows a flow diagram of an embodiment of a method 800 to enhance LiDAR data using supplementary static pressure sensor outputs and supplementary total air temperature sensor outputs in accordance with the present application. Method 800 is applicable to system 12 shown in FIG. 7 and any of the embodiments of systems described herein that process LiDAR data, static pressure data, and true air temperature to augment the air data.

At block 802, LiDAR data is input from the LiDAR sensor 20, static pressure data is input from the static pressure sensor 30, and the true temperature data is input from the total air temperature sensor 40. As shown in FIG. 7, LiDAR data from the LiDAR sensor 20 is input to the LIDAR air data processor 25, the static pressure data from the static pressure sensor 35 is input to the static pressure processor 35, and true temperature data from the total air temperature sensor 40 is input to the total air temperature processor 45. The process of block 802 is similar to the processes described above with reference to both block 402 of FIG. 4 and block 602 of FIG. 6.

At block 804, the LiDAR data, the static pressure data, and the total air temperature data is processed by executing at least one of the algorithms 91. For system 12 shown in FIG. 7, processing the LiDAR data includes processing the backscattered return signal at the LiDAR air data processor 23. For system 12 shown in FIG. 7, processing the static pressure data includes: processing the static pressure data input from the at least one static pressure sensor 30 at a static pressure processor 35 to generate static pressure; and processing the output from the static pressure processor 35 at the LiDAR air data processor 25. Likewise, for system 12 shown in FIG. 7, processing the true temperature data includes: processing the true temperature data input from the total air temperature sensor 40 at the total air temperature processor 45 to generate total air temperature; and processing the total air temperature output from the total air temperature processor 45 at the LiDAR air data processor 25, which performs additional processing. The process of block 804 is similar to the processes described above with reference to both block 404 of FIG. 4 and block 604 of FIG. 6.

The LiDAR air data processor 25 inputs the LiDAR data, the static pressure, and the total air temperature. The LiDAR air data processor 25 executes algorithms 91 to derive air data parameters of a true air speed vector, a true air temperature, and a static pressure (i.e., augmented air data) based on the processing of the LiDAR data and the static pressure data at the LiDAR air data processor 25.

At block 806, augmented air data based on the processed data is output. After processing the static pressure from the static pressure sensor 30 and the total air temperature (TAT) from the total air temperature processor 45, the LiDAR air data processor 25 outputs the augmented air data to the vehicle device 85 in the vehicle 80. The process of block 806 is similar to the processes described above with reference to both block 406 of FIG. 4 and block 606 of FIG. 6.

FIG. 9 shows an embodiment of a system 12 to enhance LiDAR data using a supplementary static pressure sensor output and optionally using a supplementary total air temperature sensor output. System 12 with the optional total air temperature sensor 40 is similar to system 12 (FIG. 7) without the static pressure processor 35 and without the total air temperature processor 45. System 12 without the optional total air temperature sensor 40 is similar to system 10 (FIG. 3A) without the static pressure processor 35.

The function of system 12 without the optional total air temperature sensor 40 is now described. The LiDAR data is input from the at least one LiDAR sensor 20 as a backscattered return signal at the LiDAR air data processor 25.

The static pressure data is output from the static pressure sensor 30 to the LiDAR air data processor 25. The LiDAR air data processor 25 processes the backscattered return signal input from the at least one LiDAR sensor along with the static pressure data input at the LiDAR air data processor 25 from the static pressure sensor 25. As described above, with reference to block 406 of FIG. 4, the LiDAR air data processor 25 derives the air data parameters of a true air speed vector, a true air temperature, and a static pressure based on processing the LiDAR data and the static pressure data. As described above, with reference to block 408 of FIG. 4, the LiDAR air data processor 25 outputs the augmented air data (i.e., the air data parameters of a true air speed vector, air temperature, and air pressure) based on processing the LiDAR data and the static pressure data.

When system 12 functions with the optional total air temperature sensor 40 the following functions are also implemented. The true temperature data is input from the at least one total air temperature sensor 40 at the LiDAR air data processor 25. Then the air data parameters of the true air speed vector, true air temperature, and static pressure are derived at the LiDAR air data processor 25 based on processing the LiDAR data, the static pressure data, and the total air temperature data.

FIG. 10 shows an embodiment of a system 13 to enhance LiDAR data using supplementary static pressure sensor outputs in accordance with the present application. System 13 includes the LiDAR sensor 20 and the static pressure sensor 30, and the vehicle device 85. In this embodiment, the LiDAR sensor 20 inputs static pressure data from the static pressure sensor 30 and outputs the LiDAR data and the static pressure data from the static pressure sensor 30 to the vehicle device 85. The vehicle device 85 executes the algorithms 91 stored in the storage medium 90 to derive the air data parameters of true air speed vector, air temperature, and static pressure by processing the LiDAR data and the static pressure data input from the LiDAR sensor.

FIG. 11 shows an embodiment of a system 14 to enhance LiDAR data using supplementary total air temperature sensor outputs and optional supplementary static pressure sensor in accordance with the present application. System 14 includes the LiDAR sensor 20, the temperature sensor 40, and the vehicle device 85. System 14 also optionally includes the static pressure sensor 30. In this embodiment, the LiDAR sensor 20 inputs true temperature data from the temperature sensor 40 and outputs the LiDAR data and the true temperature data from the LiDAR sensor 20 to the vehicle device 85. The vehicle device 85 executes the algorithms 91 stored in the storage medium 90 to derive the air data parameters of true air speed vector, air temperature, and air pressure by processing the LiDAR data and the true temperature data, which are all input from the LiDAR sensor 20.

When the optional static pressure sensor 30 is included in system 14, which is represented generally as 14' in FIG. 11, the LiDAR sensor 20 inputs true temperature data from the temperature sensor 40 and inputs static pressure data from the static pressure sensor 30. Then the LiDAR sensor 20 outputs the LiDAR data, the true temperature data from the temperature sensor 40 and the static pressure data from the static pressure sensor 30 to the vehicle device 85. The vehicle device 85 executes the algorithms 91 stored in the storage medium 90 to derive the air data parameters of true air speed vector, air temperature, and air pressure by processing the LiDAR data, the static pressure data, and the true temperature data, which are all input from the LiDAR sensor 20.

FIG. 12 shows an embodiment of a system 15 to enhance LiDAR data using supplementary static pressure sensor and optional supplementary total air temperature sensor outputs in accordance with the present application. System 15 includes the static pressure sensor 30, the LiDAR sensor 20, the vehicle device 85, and the storage medium 90 with algorithms 91. In system 15, the static pressure sensor 30 processes (or pre-processes) the sensed static pressure data and sends the static pressure data to the LiDAR sensor 20. The LiDAR sensor 20 processes the sensed LiDAR data and the static pressure data input from the static pressure sensor 30 and derives the augmented air data. The augmented air data is output from the LiDAR sensor 20 to the vehicle device 85. System 15 differs from system 13 of FIG. 10 in that the air data parameters of true air speed vector, air temperature, and air pressure are derived by processing the LiDAR data and the static pressure data at the LiDAR sensor 20. In this case, the LiDAR sensor 20 executes the algorithms 91 stored in the storage medium 90 to derive the air data parameters of true air speed vector, true air temperature, and static pressure.

In an optional embodiment of system 15, the total air temperature sensor 40 processes (or pre-processes) the sensed temperature data and sends the total air temperature data to the LiDAR sensor 20. In this embodiment, the LiDAR sensor 20 processes the sensed LiDAR data, the static pressure data input from the static pressure sensor 30, and the total air temperature input from the total air temperature sensor 40. Then the LiDAR air data processor 25 derives the augmented air data, which is output to the vehicle device 85. The augmented air data is post-processed to provide critical parameters for control of the vehicle (e.g. vehicle altitude, true air speed, Mach number, rate of climb, rate of descent, angle of side slip, and angle of attack). These critical parameters for control of the vehicle are improved (more accurate) than they would be if the sensed airspeed, air temperature and/or static pressure had not been enhanced using the techniques described herein.

The various processors described herein include or function with software programs, firmware or other computer readable instructions (e.g., algorithms 91 stored in a storage medium 90) for carrying out various methods, process tasks, calculations, and control functions, used in the LiDAR systems described herein that enhance the LiDAR data using supplementary sensor outputs. In one implementation, the processor comprises processor support chips and/or system support chips such as application-specific integrated circuits (ASICs), or Field Programmable Gate Arrays (FPGAs). In another implementation of this embodiment, the processor comprises one or more microprocessors configured to execute algorithms 91 as described herein.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example 1 includes a method of enhancing LiDAR data, the method comprising: inputting LiDAR data from at least one LiDAR sensor; inputting data from at least one of: at least one static pressure sensor; and at least one total air temperature sensor; extracting accurate air data parameters by processing one of: the LiDAR data and static pressure data from the static pressure sensor; the LiDAR data and true temperature data from the total air temperature sensor; or the LiDAR data, the static pressure data from the static pressure sensor, and the true temperature data from the total air temperature sensor; generating augmented air data based on the extracted accurate air data parameters; and outputting the augmented air data.

Example 2 includes the method of Example 1, wherein extracting accurate air data parameters comprises: facilitating a fit of a backscattered return signal to a LiDAR backscatter lineshape to extract the accurate air data parameters.

Example 3 includes the method of Example 2, further comprising: inputting the augmented air data at one of: a flight management system; or a vehicle computer; and generating critical parameters for control of a vehicle based on the augmented air data input to the one of: the flight management system; or the vehicle computer.

Example 4 includes the method of Example 3, wherein the critical parameters for control of the vehicle include at least one of vehicle altitude, true air speed, Mach number, rate of climb, rate of descent, angle of side slip, and angle of attack, the method further comprising: using the critical parameters at the flight management system to control the vehicle.

Example 5 includes the method of any of Examples 1-4, wherein inputting data from at least one of: the at least one static pressure sensor; and the at least one total air temperature sensor comprises: inputting static pressure data from the at least one static pressure sensor, wherein the processing comprises processing the LiDAR data and the static pressure data.

Example 6 includes the method of Example 5, wherein inputting the LiDAR data from the at least one LiDAR sensor comprises inputting a backscattered return signal having a LiDAR backscatter lineshape at a LiDAR air data processor, wherein processing the static pressure data comprises processing the static pressure data input from the at least one static pressure sensor at a static pressure processor, the method further comprising: outputting static pressure from the static pressure processor to the LiDAR air data processor; and deriving the air data parameters of a true air speed vector, a true air temperature, and a static pressure based on the processing of the LiDAR data and the static pressure at the LiDAR air data processor.

Example 7 includes the method of any of Examples 5-6, wherein inputting the LiDAR data from the at least one LiDAR sensor comprises inputting a backscattered return signal having a LiDAR backscatter lineshape at a LiDAR air data processor, the method further comprising: outputting the static pressure data from the at least one static pressure sensor to the LiDAR air data processor, wherein processing the static pressure data comprises: processing the static pressure data input from the at least one static pressure sensor at the LiDAR air data processor; the method further comprising: deriving the air data parameters of a true air speed vector, a true air temperature, and a static pressure based on processing the LiDAR data and the static pressure data at the LiDAR air data processor.

Example 8 includes the method of any of Examples 1-7, the method further comprising: outputting the static pressure data from the at least one static pressure sensor to the at least one LiDAR sensor; and outputting the LiDAR data and the static pressure data from the at least one LiDAR sensor to a vehicle device, wherein the processing comprises processing the LiDAR data and the static pressure data at the vehicle device, the method further comprising: deriving the air data parameters of a true air speed vector, a true air temperature, and a static pressure based on processing the LiDAR data and the static pressure data at the vehicle device.

Example 9 includes the method of Example 8, the method further comprising: outputting the true temperature data from the at least one total air temperature sensor to the at least one LiDAR sensor, wherein the outputting the LiDAR data and the static pressure data from the at least one LiDAR sensor further comprises outputting the LiDAR data, the static pressure data, and the true temperature data from the at least one LiDAR sensor to the vehicle device, wherein the processing the LiDAR data and the static pressure data at the vehicle device further comprises processing the LiDAR data, the static pressure data, and the true temperature data at the vehicle device, and wherein the deriving further comprises deriving the air data parameters of the true air speed vector, the true air temperature, and the static pressure based on processing the LiDAR data, the static pressure data, and the temperature data at the vehicle device.

Example 10 includes the method of any of Examples 1-9, wherein inputting data from at least one of: the at least one static pressure sensor; and the at least one total air temperature sensor comprises: inputting true temperature data from the at least one total air temperature sensor, wherein the processing comprises processing the LiDAR data and the true temperature data wherein inputting the LiDAR data from the at least one LiDAR sensor comprises inputting a backscattered return signal having a LiDAR backscatter lineshape at a LiDAR air data processor, wherein processing the true temperature data comprises processing the temperature data input from the at least one total air temperature sensor at a total air temperature processor to generate total air temperature data, the method further comprising: outputting the total air temperature data from the total air temperature processor to the LiDAR air data processor; and deriving the air data parameters of a true air speed vector, a true air temperature, and a static pressure based on the processing of the LiDAR data and the total air temperature data at the LiDAR air data processor.

Example 11 includes the method of any of Examples 1-10, wherein inputting data from at least one of: the at least one static pressure sensor; and the at least one total air temperature sensor comprises: inputting static pressure data from the at least one static pressure sensor; and inputting true temperature data from the at least one total air temperature sensor, wherein the processing comprises processing the LiDAR data, the static pressure data from the static pressure sensor, and the true temperature data from the total air temperature sensor.

Example 12 includes the method of Example 11, wherein processing the LiDAR data comprises: processing, at a LiDAR air data processor, a backscattered return signal input from the at least one LiDAR sensor, wherein processing the static pressure data includes processing the static pressure data input from the at least one static pressure sensor at a static pressure processor to generate static pressure, wherein processing the true temperature data includes processing the true temperature data input from the at least one total air temperature sensor at a total air temperature processor to generate true air temperature data, the method further comprising: outputting the static pressure from the static pressure processor to the LiDAR air data processor; outputting the total air temperature data from the total air temperature processor to the LiDAR air data processor; and deriving the air data parameters of a true air speed vector, a true air temperature, and a static pressure based on the processing of the LiDAR data, the static pressure, and the total air temperature data at the LiDAR air data processor.

Example 13 includes the method of any of Examples 1-12, wherein inputting data from at least one of: the at least one static pressure sensor; and the at least one total air temperature sensor comprises: inputting static pressure data from the at least one static pressure sensor at the at least one LiDAR sensor; and inputting true temperature data from the at least one total air temperature sensor at the at least one LiDAR sensor, wherein the processing comprises: processing the LiDAR data, the static pressure data from the static pressure sensor, and the true temperature data from the total air temperature sensor at the at least one LiDAR sensor, the method further comprising: deriving the air data parameters of a true air speed vector, a true air temperature, and a static pressure based on the processing of the LiDAR data, the static pressure data, and the total air temperature data at the at least one LiDAR sensor.

Example 14 includes the method of any of Examples 1-13, wherein inputting data from at least one of: the at least one static pressure sensor; and the at least one total air temperature sensor comprises: inputting static pressure data from the at least one static pressure sensor at the at least one LiDAR sensor, wherein the processing comprises processing the LiDAR data and the static pressure data from the static pressure sensor at the at least one LiDAR sensor, the method further comprising: deriving the air data parameters of a true air speed vector, a true air temperature, and a static pressure based on the processing of the LiDAR data and the static pressure data at the at least one LiDAR sensor.

Example 15 includes a system to enhancing LiDAR data, the system including: at least one LiDAR sensor to sense a backscattered return signal having a LiDAR backscatter lineshape for use on a vehicle; at least one of at least one static pressure sensor and at least one total air temperature sensor for use on the vehicle; and means for processing data from the at least one LiDAR sensor and data from at least one of: the at least one static pressure sensor; and the at least one total air temperature sensor, wherein the means for processing: facilitates a fit of the backscattered return signal to the LiDAR backscatter lineshape; extracts accurate air data parameters based on the fitting; and outputs augmented air data based on accurate air data parameters.

Example 16 includes the system of Example 15, wherein the means for processing data from the at least one LiDAR sensor and data from at least one of: the at least one static pressure sensor; and the at least one total air temperature sensor comprises: a LiDAR air data processor configured to input LiDAR data from the at least one LiDAR sensor; and a static pressure processor configured to input static pressure data from the at least one static pressure sensor and to output a static pressure to the LiDAR air data processor, wherein the augmented air data is output from the LiDAR air data processor.

Example 17 includes the system of any of Examples 15-16, wherein the means for processing data from the at least one LiDAR sensor and data from at least one of: the at least one static pressure sensor; and the at least one total air temperature sensor comprises: a LiDAR air data processor configured to input LiDAR data from the at least one LiDAR sensor; and a total air temperature processor configured to input true temperature data from the at least one total air temperature sensor (TAT) and to output total air temperature data to the LiDAR air data processor, wherein the augmented air data is output from the LiDAR air data processor.

Example 18 includes the system of any of Examples 15-17, wherein the at least one static pressure sensor is at least one at least one flush orifice static pressure sensor.

Example 19 includes a system to enhance LiDAR data, system including: at least one LiDAR sensor configured output LiDAR data, the LiDAR data comprising a backscattered return signal having a LiDAR backscatter lineshape; at least one flush orifice static pressure sensor configured to output static pressure data; a LiDAR air data processor configured to process LiDAR data input from the at least one LiDAR sensor; a static pressure processor, the static pressure processor configured to process the static pressure data input from the at least one static pressure sensor and to output a static pressure to the LiDAR air data processor; and wherein the LiDAR air data processor is configured to derive air data parameters of a true air speed vector, a true air temperature, and a static pressure based on processing the static pressure data and the LiDAR data.

Example 20 includes system of Example 19, the system further comprising: at least one total air temperature sensor configured to output true temperature data; and a total air temperature processor, the total air temperature processor configured to process data input from the at least one total air temperature sensor and to output total air temperature data to the LiDAR air data processor, wherein the LiDAR air data processor is further configured to derive the air data parameters of the true air speed vector, the true air temperature, and the static pressure based on processing the total air temperature data.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of enhancing LiDAR data extraction, the method comprising:
    inputting, from at least one LiDAR sensor, LiDAR data generated from a backscattered return signal;
    inputting sensor data from at least one pressure sensor, or at least one temperature sensor, or combinations thereof;
    extracting air data parameters with enhanced accuracy by a process comprising:
        providing a model representing a lineshape used to fit the backscattered return signal, the model represented by a function having a set of variables comprising P, T, $L_p$, D, $V_s$, m, or r, which respectively represent air pressure, air temperature, laser properties, Doppler shift, sampling volume of the LiDAR sensor, Mie scattering, and Rayleigh scattering;
        enhancing the fit of the lineshape to the backscattered return signal by restricting the pressure variable by using the sensor data from the at least one pressure sensor; or
        enhancing the fit of the lineshape to the backscattered return signal by restricting the temperature variable by using the sensor data from the at least one temperature sensor; or
        enhancing the fit of the lineshape to the backscattered return signal by restricting the pressure variable and the temperature variable by using the sensor data from a combination of the at least one pressure sensor and the at least one temperature sensor;
        wherein by using the sensor data from the at least one pressure sensor, or the sensor data from the at least one temperature sensor, or the sensor data from the combination of the at least one pressure sensor and the at least one temperature sensor, a calculated accuracy of any remaining variables is enhanced by reducing the degrees of freedom of the fit;
    generating augmented air data based on the extracted air data parameters; and
    outputting the augmented air data.

2. The method of claim 1, further comprising:
    inputting the augmented air data at one of: a flight management system; or a vehicle computer; and
    generating critical parameters for control of a vehicle based on the augmented air data input to the one of: the flight management system; or the vehicle computer.

3. The method of claim 2, wherein the critical parameters for control of the vehicle include at least one of vehicle altitude, true air speed, Mach number, rate of climb, rate of descent, angle of side slip, and angle of attack, the method further comprising:
    using the critical parameters at the flight management system to control the vehicle.

4. The method of claim 1, wherein inputting sensor data from at least one pressure sensor comprises:
    inputting static pressure data from at least one static pressure sensor.

5. The method of claim 4,
    wherein inputting the LiDAR data from the at least one LiDAR sensor comprises inputting the backscattered return signal having a LiDAR backscatter lineshape at a LiDAR air data processor,
    wherein the static pressure data input from the at least one static pressure sensor is processed at a static pressure processor, the method further comprising:
        outputting static pressure from the static pressure processor to the LiDAR air data processor; and
        deriving the air data parameters of a true air speed vector, a true air temperature, and a static pressure based on the processing of the LiDAR data and the static pressure at the LiDAR air data processor.

6. The method of claim 4, wherein inputting the LiDAR data from the at least one LiDAR sensor comprises inputting the backscattered return signal having a LiDAR backscatter lineshape at a LiDAR air data processor, the method further comprising:
    outputting the static pressure data from the at least one static pressure sensor to the LiDAR air data processor;
    processing the static pressure data input from the at least one static pressure sensor at the LiDAR air data processor; and
    deriving the air data parameters of a true air speed vector, a true air temperature, and a static pressure based on processing the LiDAR data and the static pressure data at the LiDAR air data processor.

7. A system to enhance LiDAR data extraction, the system comprising:
    at least one LiDAR sensor configured to generate LiDAR data from a backscattered return signal for use on a vehicle;
    at least one pressure sensor configured to generate pressure data, or at least one temperature sensor configured to generate temperature data, or combinations thereof, for use on the vehicle; and
    at least one processor operative to process the LiDAR data from the at least one LiDAR sensor, and sensor data from the at least one pressure sensor or the at least one temperature sensor or the combinations thereof, wherein the at least one processor is operative to extract air data parameters with enhanced accuracy by a process comprising:
        providing a model representing a lineshape used to fit the backscattered return signal, the model represented by a function having a set of variables comprising P, T, $L_p$, D, $V_s$, m, or r, which respectively represent air pressure, air temperature, laser properties, Doppler shift, sampling volume of the LiDAR sensor, Mie scattering, and Rayleigh scattering;

enhancing the fit of the lineshape to the backscattered return signal by restricting the pressure variable by using the sensor data from the at least one pressure sensor; or enhancing the fit of the lineshape to the backscattered return signal by restricting the temperature variable by using the sensor data from the at least one temperature sensor; or enhancing the fit of the lineshape to the backscattered return signal by restricting the pressure variable and the temperature variable by using the sensor data from a combination of the at least one pressure sensor and the at least one temperature sensor;

wherein by using the sensor data from the at least one pressure sensor, or the sensor data from the at least one temperature sensor, or the sensor data from the combination of the at least one pressure sensor and the at least one temperature sensor, a calculated accuracy of any remaining variables is enhanced by reducing the degrees of freedom of the fit.

8. The system of claim 7, wherein the at least one processor comprises:

a LiDAR air data processor configured to input the LiDAR data from the at least one LiDAR sensor; and a static pressure processor configured to input static pressure data from the at least one pressure sensor and to output a static pressure to the LiDAR air data processor, wherein augmented air data is output from the LiDAR air data processor.

* * * * *